(12) United States Patent
Chavez

(10) Patent No.: US 9,992,047 B1
(45) Date of Patent: Jun. 5, 2018

(54) PSEUDOMORPHIC MODULATION FOR RF SIGNAL TRANSMISSION

(75) Inventor: Carlos J. Chavez, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 1302 days.

(21) Appl. No.: 13/069,885

(22) Filed: Mar. 23, 2011

(51) Int. Cl.
*H04L 27/00* (2006.01)

(52) U.S. Cl.
CPC .................................. *H04L 27/00* (2013.01)

(58) Field of Classification Search
USPC .................... 375/295, 130, 140, 146, 147
See application file for complete search history.

(56) References Cited

U.S. PATENT DOCUMENTS

| 2003/0026197 A1* | 2/2003 | Crawford ...................... 370/203 |
| 2003/0053520 A1* | 3/2003 | Nelson et al. ................. 375/142 |
| 2004/0101034 A1* | 5/2004 | Ben-David et al. ........... 375/148 |

* cited by examiner

*Primary Examiner* — Kevin M Burd
(74) *Attorney, Agent, or Firm* — Angel N. Gerdzhikov; Donna P. Suchy; Daniel M. Barbieri

(57) ABSTRACT

A method for pseudomorphic modulation to mimic a particular type of Radio Frequency (RF) signal transmission in an RF environment may include selecting a physical modulation scheme that is utilized for RF signal transmission in the RF environment. The method may also include pseudorandomly generating a plurality of symbols associated with the physical modulation scheme. The method may further include receiving encoded data for transmitting in the RF environment. The method may also include pseudomorphically modulating the encoded data by mapping the encoded data to the plurality of pseudorandomly generated symbols.

20 Claims, 5 Drawing Sheets

PSEUDOMORPHIC MODULATION FOR RF SIGNAL TRANSMISSION

TECHNICAL FIELD

The present disclosure generally relates to the field of electronic signal transmission, and more particularly to a method and computer program product for pseudomorphically modulating an RF signal to mimic a particular type of RF transmission.

BACKGROUND

In a non-permissive environment, where the transmission of electromagnetic signals is subject to disruptive communications, such as jamming, or the like, Low probability of Detection (LPD) and robust Anti-Jamming (AJ) performance are desirable traits for tactical communication systems. However, techniques typically utilized for increased LPD and/or AJ performance, such as spread spectrum techniques, may sacrifice bandwidth and/or data rate to achieve performance.

SUMMARY

A method for pseudomorphic modulation to mimic a particular type of Radio Frequency (RF) signal transmission in an RF environment may include selecting a physical modulation scheme that is utilized for RF signal transmission in the RF environment. The method may also include pseudorandomly generating a plurality of symbols associated with the physical modulation scheme. The method may further include receiving encoded data for transmitting in the RF environment. The method may also include pseudomorphically modulating the encoded data by mapping the encoded data to the plurality of pseudorandomly generated symbols.

A method for mimicking a particular type of Radio Frequency (RF) signal transmission in an RF environment may include selecting a physical modulation scheme that is utilized for RF signal transmission in the RF environment. The method may also include synchronizing an RF transmission module and an RF receiving module to generate an identical sequence of pseudorandom numbers. The method may further include generating a plurality of symbols associated with the physical modulation scheme based upon the sequence of pseudorandom numbers. The method may also include receiving encoded data for transmitting in the RF environment. The method may further include pseudomorphically modulating the encoded data by mapping the encoded data to the plurality of pseudorandomly generated symbols. The method may also include converting the pseudomorphically modulated signal to RF for transmission by an RF transmitter. The method may further include transmitting the RF signal via the transmission module. The method may also include receiving the RF signal via the receiving module. The method may further include demodulating the RF signal utilizing the plurality of symbols associated with the physical modulation scheme based upon the sequence of pseudorandom numbers.

A computer program product may include a recordable-type signal bearing medium bearing computer usable code configured for selecting a physical modulation scheme that is utilized for RF signal transmission in an RF environment. The computer program product may also include a recordable-type signal bearing medium bearing computer usable code configured for pseudorandomly generating a plurality of symbols associated with the physical modulation scheme. The computer program product may further include a recordable-type signal bearing medium bearing computer usable code configured for receiving encoded data for transmitting in the RF environment. The computer program product may also include a recordable-type signal bearing medium bearing computer usable code configured for pseudomorphically modulating the encoded data by mapping the encoded data to the plurality of pseudorandomly generated symbols.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Referring generally to FIGS. 1A through 4, a method and computer program product for pseudomorphic modulation to mimic a particular type of Radio Frequency (RF) signal transmission in an RF environment are described. Pseudomorphic modulation allows a waveform to take on the traits of an arbitrary physical modulation scheme. This enables the mimicking of other emitters in the RF environment, and the occupation of the same spectrum. This may greatly complicate detection by other systems, and may induce reluctance to jam on the part of other systems for fear of unintended jamming. For example, a signal transmission scheme may be implemented that mimics a wireless networking (wi-fi) signal or a cellular telephone signal.

Referring now to FIG. 1, a method 100 may include selecting a physical modulation scheme that is utilized for RF signal transmission in an RF environment, 110. For example, a modulation scheme such as Minimum Shift Keying (MSK), Gaussian Minimum Shift Keying (GMSK), Continuous Phase Modulation (CPM), Phase Shift Keying (PSK), Quadrature Amplitude Modulation (QAM), or Orthogonal Frequency Division Multiplexing (OFDM) may be selected. It will be appreciated that these modulation schemes are provided by way of example only, and are not meant to limit the present disclosure. Thus, other modulation schemes may be utilized as well.

The method 100 may also include pseudorandomly generating symbols associated with the physical modulation scheme, 120. In embodiments, the pseudorandomly generated symbols are generated based upon symbol definitions that may include symbol values, constellation points, allowable transitions, probabilities, and/or other considerations for mimicking a particular type of RF signal transmission. For example, a rectangular modulation scheme may utilize phase and amplitude modulation. In this example, the phase and amplitude of a signal can be resolved into an amplitude and angle, which may be represented in two dimensions as a value/constellation point/symbol having a real part and an imaginary part.

Figure 5:
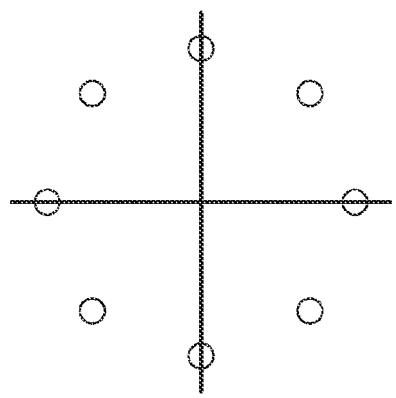
FIG. 5 is a schematic illustrating allowable symbols for an 8-ary Phase Shift Keying (8PSK) transmission scheme.

Thus, a signal may be represented by values measured along a real axis and/or an imaginary axis. For example, FIG. 5 depicts allowable symbols for an 8-ary Phase Shift Keying (8PSK) transmission scheme. In the case of MSK, where a value may be limited to either a positive value or a negative value on either the positive axis or the negative axis, allowable transitions may be limited to a move of 90° for each successive symbol. Further, in some instances, symbol definitions may include probabilities that dictate how often a particular symbol should be utilized, in order to mimic a type of signal transmission.

The method 100 may further include receiving encoded data for transmitting in the RF environment, 130. In embodiments, the encoded data may include a stream of binary encoded data. For example, binary encoded data may be produced utilizing forward error correction and/or interleaving. Further, it is contemplated that bit values of the data may be balanced prior to encoding the data (e.g., to provide a more well-balanced distribution of binary values). However, it should be noted that the encoded data may be implemented as other types of data, including 4-ary data and/or 16-ary data.

Figure 1A:
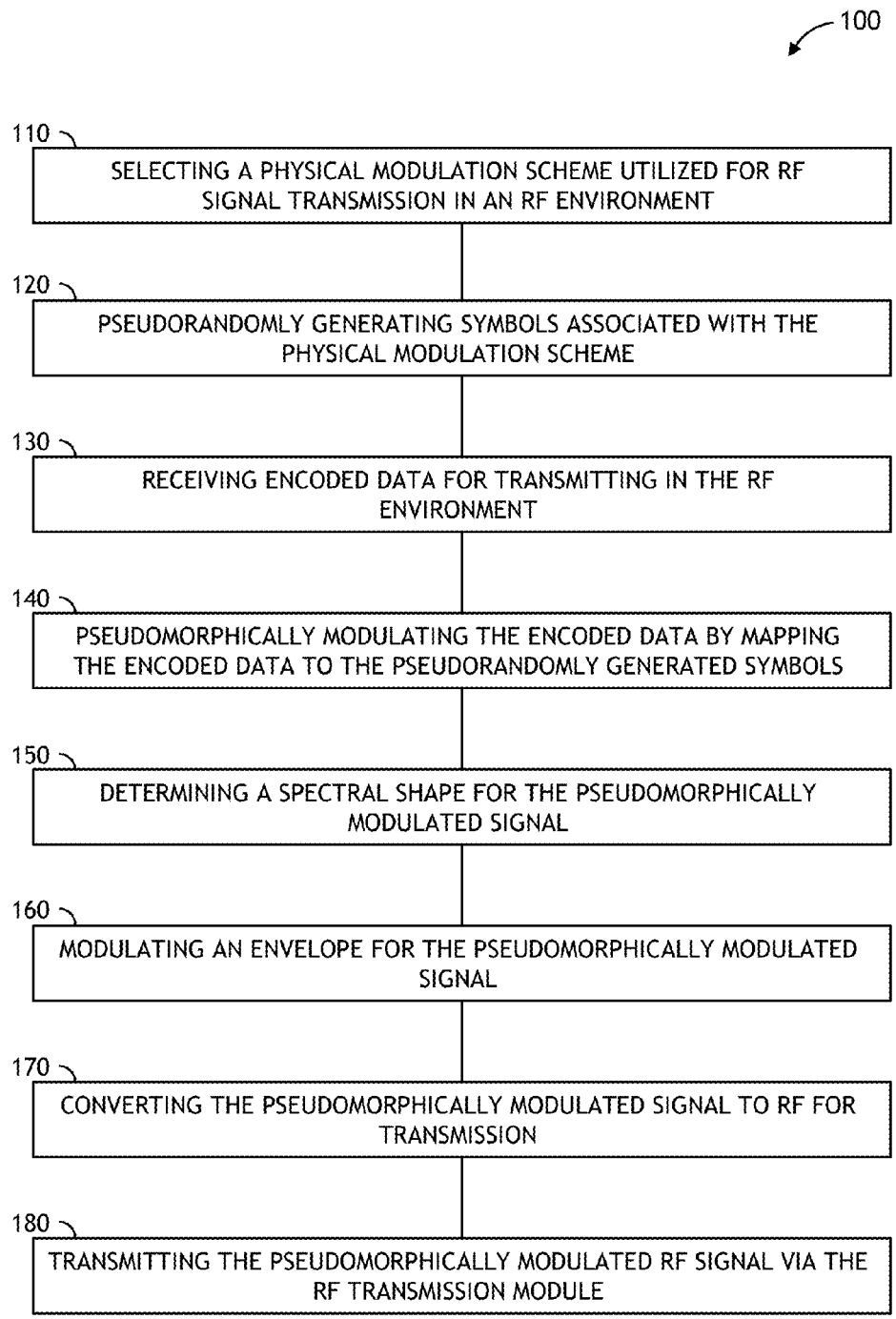
FIG. 1 is a flow diagram illustrating a method for pseudomorphic modulation to mimic a particular type of Radio Frequency (RF) signal transmission in an RF environment.
Figure 7:
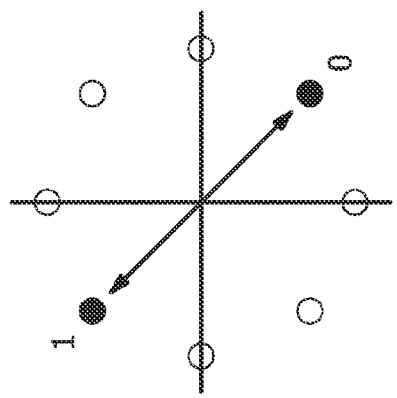
FIG. 7 is a schematic illustrating a pseudorandomly generated symbol and its inverse as selected by encoded data bit.
Figure 6:
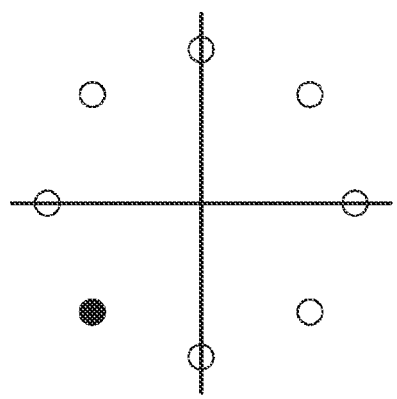
FIG. 6 is a schematic illustrating a pseudorandomly generated symbol for an encoded data bit.

The method 100 may also include pseudomorphically modulating the encoded data by mapping the encoded data to the pseudorandomly generated symbols, 140. For example, each incoming bit of a stream of binary encoded data may be mapped to a symbol selected based upon the symbol definitions described above. As described in the 8PSK example shown in FIG. 6, a symbol may be pseudorandomly generated for each encoded data bit. Further, as described in FIG. 7, the generated symbol (or its inverse) may be selected by encoded data bit. Referring to FIG. 1A, single-carrier pseudomorphic modulation may further include determining a spectral shape for the pseudomorphically modulated signal, 150. The method 100 may also include modulating an envelope for the pseudomorphically modulated signal, 160. For instance, with reference to FIG. 2, a pulse shaping module may be utilized to determine the spectral shape, and a phase/frequency modulation module may be utilized for constant envelope modulations (e.g., in implementations of GMSK or CPM). In other implementations, the phase/frequency modulation module may be bypassed (e.g., in implementations of PSK and QAM). It will be appreciated that these techniques may be replicated across of a number of singe-carrier pseudomorphic modulation modules to provide a multi-carrier signal. For example, two single-carrier modules may be combined together to provide a signal having two sub-carriers.

Figure 1B:
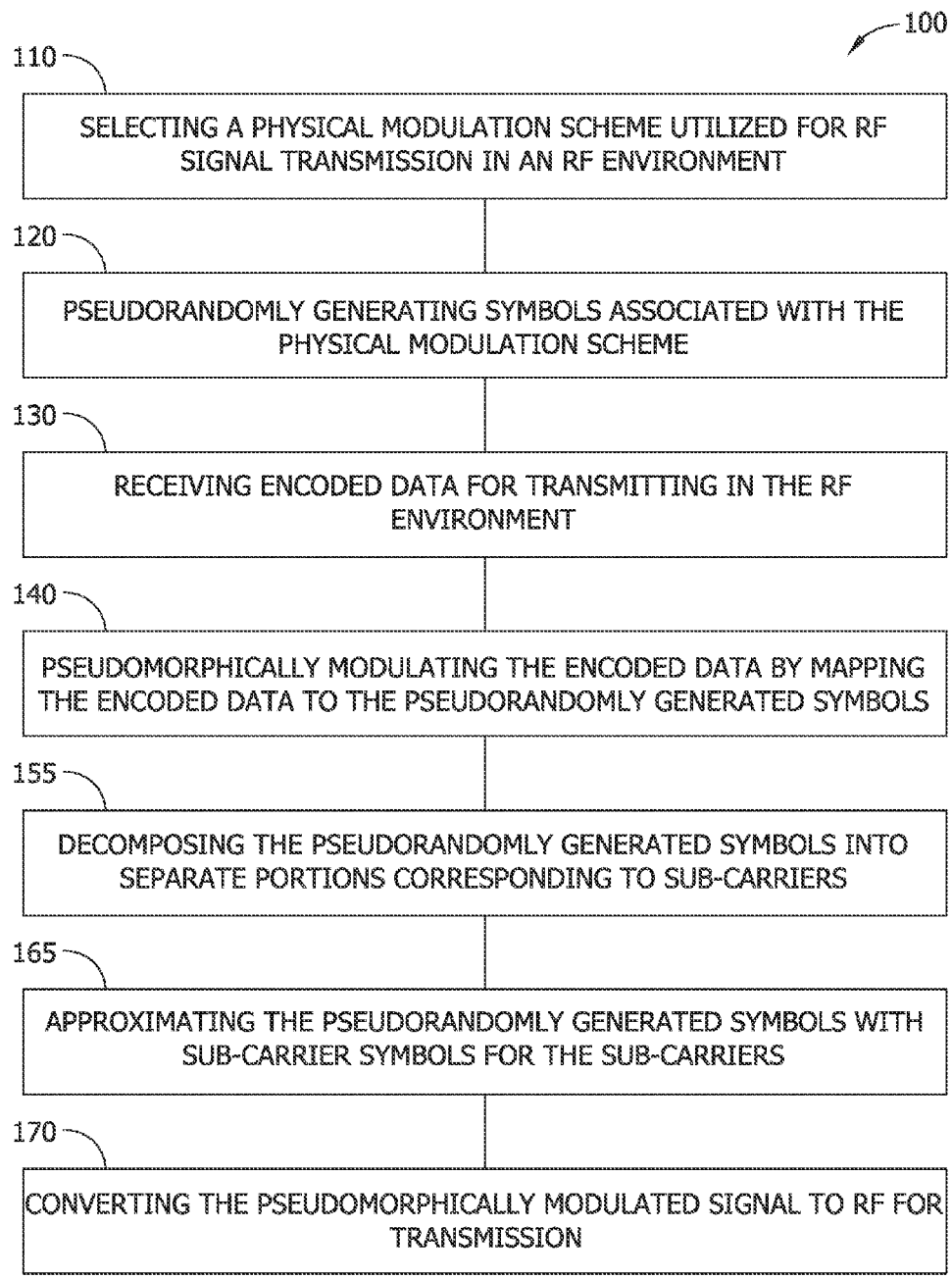
Figure 2:
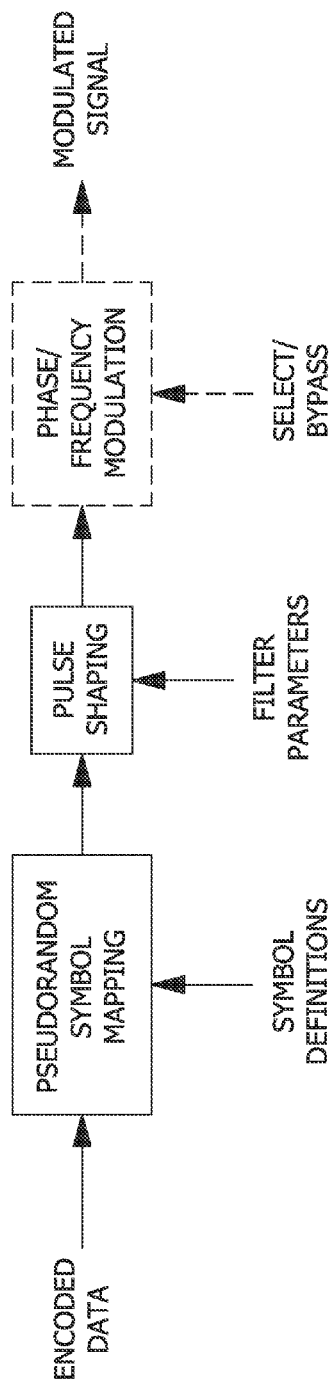
FIG. 2 is a block diagram of single-carrier pseudomorphic modulation.
Figure 3:
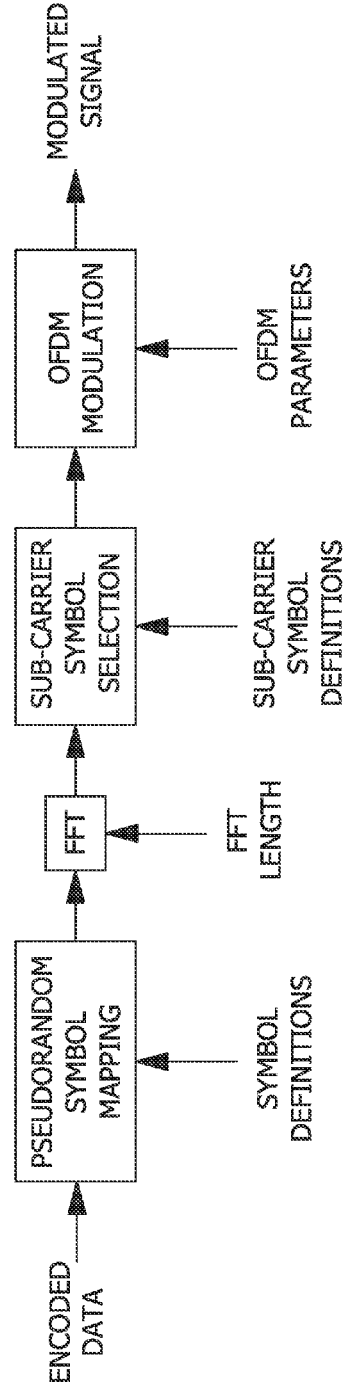
FIG. 3 is a block diagram of multi-carrier pseudomorphic modulation for Orthogonal Frequency Division Multiplexing (OFDM)

Referring to FIG. 1B, multi-carrier pseudomorphic modulation may further include decomposing the pseudorandomly generated symbols into separate portions corresponding to sub-carriers, 155. The method 100 may also include approximating the pseudorandomly generated symbols with sub-carrier symbols for the sub-carriers, 165. For instance, with reference to FIG. 3, a Fast Fourier Transform (FFT) module may be utilized to decompose the symbol sequence into bins corresponding to OFDM sub-carriers. Then, a sub-carrier selection module may be utilized to determine sub-carrier symbols that best approximate the overall signal. As previously described, the sub-carrier symbol definitions may include possible symbol values, allowable transitions, probabilities, and/or other considerations for mimicking a particular type of RF signal transmission. Thus, the OFDM modulation produces an OFDM signal with the selected sub-carrier symbols.

The method 100 may also include converting the pseudomorphically modulated signal to RF for transmission by an RF transmitter, 170. The result may be a (generally) complex-valued modulated signal. The method 100 may also include, at a step 180, transmitting the pseudomorphically modulated signal via the RF transmission module. It should be noted that a receiver will require a priori knowledge of the pseudorandom symbol mapping (and possibly other parameters) in order to successfully synchronize and demodulate the modulated signal. For example, pseudorandom number generators may be included with both the transmitter and receiver, where the pseudorandom number generators are synchronized to produce the same sequence of numbers. This sequence may be utilized by the transmitter to produce the pseudorandomly generated symbols, (see, for example, the pseudorandom symbol mapping module illustrated in FIGS. 1A and 1B, and the pseudomorphic modulation example illustrated in FIGS. 5 through 7). Further, this sequence may be utilized by the receiver to undo the pseudorandomization.

It should be noted that in some instances, pseudorandomization may induce an approximation error (noise) in the resultant signal. However, it is contemplated that a receiver may be configured to ignore the error, especially in cases where there is a high degree of redundancy built into the data and/or where the signal to noise ratio is high based upon a particular transmission technique. For example, in the case of OFDM signal transmission, a single information bit may be spread across 100 sub-carrier symbols. Thus, noise caused by approximating the bit may be may be insignificant with respect to the spreading gain achieved by the receiver.

Figure 4:
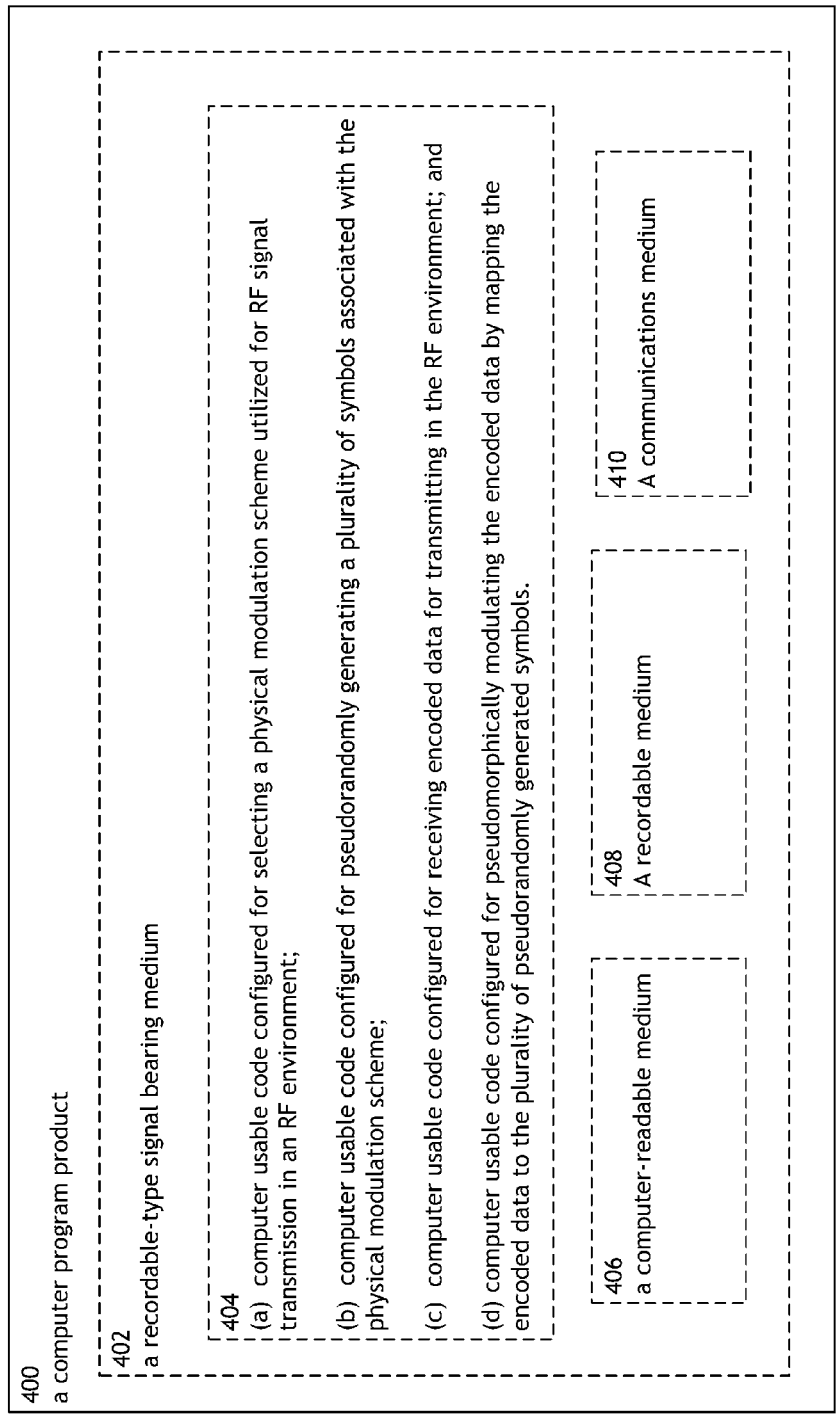
FIG. 4 illustrates a computer program product related to selecting a physical modulation scheme utilized for RF signal transmission in an RF environment; pseudorandomly generating a plurality of symbols associated with the physical modulation scheme; receiving encoded data for transmitting in the RF environment; and pseudomorphically modulating the encoded data by mapping the encoded data to the plurality of pseudorandomly generated symbols.

In some implementations, method 100 may be implemented in a Field Programmable Gate Array (FPGA) or another programmable logic device. Further, method 100 may be implemented directly in hardware, such as in an Application Specific Integrated Circuit (ASIC). FIG. 4 illustrates a partial view of an example computer program product 400 that includes a computer program 404 for executing a computer process on a computing device. An embodiment of the example computer program product 400 is provided using a recordable-type signal bearing medium 402, and may include computer usable code configured for selecting a physical modulation scheme utilized for RF signal transmission in an RF environment. The computer program product may also include a recordable-type signal bearing medium bearing computer usable code configured for pseudorandomly generating a plurality of symbols associated with the physical modulation scheme. The computer program product may include a recordable-type signal bearing medium bearing computer usable code configured for receiving encoded data for transmitting in the RF environment. The computer program product may include a recordable-type signal bearing medium bearing computer usable code configured for pseudomorphically modulating the encoded data by mapping the encoded data to the plurality of pseudorandomly generated symbols. The computer usable code may be, for example, computer executable and/or logic-implemented instructions. In one implementation, the signal-bearing medium 402 may include a computer-readable medium 406. In one implementation, the signal bearing medium 402 may include a recordable medium 408. In one implementation, the signal bearing medium 402 may include a communications medium 410.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for pseudomorphic modulation to mimic a Radio Frequency (RF) signal transmission in an RF environment, the method comprising:
   using a computer or processor to perform the steps of:
   selecting a physical modulation scheme, the selected physical modulation scheme 1) a mimic of at least one of: a wireless networking signal and a cellular telephone signal, 2) occupying a spectrum used by one of the wireless networking signal and the cellular telephone signal;
   pseudorandomly generating a plurality of symbols associated with the physical modulation scheme, each of the plurality of symbols including a symbol definition for mimicking the wireless networking signal and the cellular telephone signal, the symbol definition at least one of: a symbol value, a constellation point, an allowable transition and a probability;
   receiving encoded data for transmitting in the RF environment;
   pseudomorphically modulating the encoded data to generate a pseudomorphically modulated signal by mapping the encoded data to the plurality of pseudorandomly generated symbols;
   converting the pseudomorphically modulated signal to RF for transmission by an RF transmission module; and
   transmitting the pseudomorphically modulated RF signal within the spectrum via the RF transmission module.

2. The method of claim 1, wherein the physical modulation scheme comprises one of: Minimum Shift Keying (MSK), Gaussian Minimum Shift Keying (GMSK), Continuous Phase Modulation (CPM), Phase Shift Keying (PSK), Quadrature Amplitude Modulation (QAM), and Orthogonal Frequency Division Multiplexing (OFDM).

3. The method of claim 1, wherein pseudorandomly generating a plurality of symbols associated with the physical modulation scheme comprises:
   identifying at least one of: a possible symbol value, an allowable transition, and a probability for the physical modulation scheme.

4. The method of claim 1, wherein the encoded data includes a stream of binary encoded data.

5. The method of claim 1, further comprising:
   determining a spectral shape for the pseudomorphically modulated signal.

6. The method of claim 5, further comprising:
   modulating an envelope for the pseudomorphically modulated signal.

7. The method of claim 1, further comprising:
   decomposing the plurality of pseudorandomly generated symbols into separate portions corresponding to a plurality of sub-carriers; and
   approximating the pseudorandomly generated symbols with a plurality of sub-carrier symbols for the plurality of sub-carriers.

8. A method for mimicking a Radio Frequency (RF) signal transmission in an RF environment, the method comprising:
   using a computer or processor to perform the steps of:
   selecting a physical modulation scheme, the selected physical modulation scheme 1) a mimic of at least one of: a wireless networking signal and a cellular telephone signal, 2) occupying a spectrum used by one of the wireless networking signal and the cellular telephone;
   synchronizing an RF transmission module associated with a RF transmitter and an RF receiving module associated with a RF receiver to generate an identical sequence of pseudorandom numbers;
   generating a plurality of symbols associated with the physical modulation scheme based upon the sequence of pseudorandom numbers, each of the plurality of symbols including a symbol definition for mimicking the wireless networking signal and the cellular telephone signal, the symbol definition at least one of: a symbol value, a constellation point, an allowable transition and a probability;
   receiving encoded data for transmitting in the RF environment;
   pseudomorphically modulating the encoded data to generate a pseudomorphically modulated signal by mapping the encoded data to the generated plurality of symbols;
   converting the pseudomorphically modulated signal to RF for transmission by the RF transmitter;
   transmitting the RF signal by the RF transmitter within the spectrum via the transmission module;
   receiving the RF signal by the RF receiver via the RF receiving module; and
   demodulating the RF signal by the RF receiver utilizing the plurality of symbols associated with the physical modulation scheme based upon the sequence of pseudorandom numbers.

9. The method of claim 8, wherein the physical modulation scheme comprises one of: Minimum Shift Keying (MSK), Gaussian Minimum Shift Keying (GMSK), Continuous Phase Modulation (CPM), Phase Shift Keying (PSK), Quadrature Amplitude Modulation (QAM), and Orthogonal Frequency Division Multiplexing (OFDM).

10. The method of claim 8, wherein pseudorandomly generating a plurality of symbols associated with the physical modulation scheme comprises:
identifying at least one of: a possible symbol value, an allowable transition, and a probability for the physical modulation scheme.

11. The method of claim 8, wherein the encoded data includes a stream of binary encoded data.

12. The method of claim 8, further comprising:
determining a spectral shape for the pseudomorphically modulated signal.

13. The method of claim 12, further comprising:
modulating an envelope for the pseudomorphically modulated signal.

14. The method of claim 8, further comprising:
decomposing the plurality of pseudorandomly generated symbols into separate portions corresponding to a plurality of sub-carriers; and
approximating the pseudorandomly generated symbols with a plurality of sub-carrier symbols for the plurality of sub-carriers.

15. A computer readable medium having non-transitory computer readable program code embodied therein for pseudomorphic modulation to mimic a particular type of Radio Frequency (RF) signal transmission in an RF environment, the computer readable program code comprising instructions which, when executed by a computer device or processor, perform and direct the steps of:
selecting a physical modulation scheme, the selected physical modulation scheme 1) a mimic of at least one of: a wireless networking signal and a cellular telephone signal, 2) occupying a spectrum used by one of the wireless networking signal and the cellular telephone signal;
synchronizing an RF transmission module associated with a RF transmitter and an RF receiving module associated with a RF receiver to generate an identical sequence of pseudorandom numbers;
generating a plurality of symbols associated with the physical modulation scheme based upon the sequence of pseudorandom numbers, each of the plurality of symbols including a symbol definition for mimicking the wireless networking signal and the cellular telephone signal, the symbol definition at least one of: a symbol value, a constellation point, an allowable transition and a probability;
receiving encoded data for transmitting in the RF environment;
pseudomorphically modulating the encoded data to generate a pseudomorphically modulated signal by mapping the encoded data to the generated plurality of symbols;
converting the pseudomorphically modulated signal to RF for transmission by the RF transmitter;
transmitting the RF signal by the RF transmitter within the spectrum via the transmission module;
receiving the RF signal by the RF receiver via the RF receiving module; and
demodulating the RF signal by the RF receiver utilizing the plurality of symbols associated with the physical modulation scheme based upon the sequence of pseudorandom numbers.

16. The computer readable medium of claim 15, wherein the physical modulation scheme comprises one of: Minimum Shift Keying (MSK), Gaussian Minimum Shift Keying (GMSK), Continuous Phase Modulation (CPM), Phase Shift Keying (PSK), Quadrature Amplitude Modulation (QAM), and Orthogonal Frequency Division Multiplexing (OFDM).

17. The computer readable medium of claim 15, wherein generating a plurality of symbols associated with the physical modulation scheme comprises:
identifying at least one of: a possible symbol value, an allowable transition, and a probability for the physical modulation scheme.

18. The computer readable medium of claim 15, further comprising:
determining a spectral shape for the pseudomorphically modulated signal.

19. The computer readable medium of claim 18, further comprising:
modulating an envelope for the pseudomorphically modulated signal.

20. The computer readable medium of claim 15, further comprising:
decomposing the plurality of pseudorandomly generated symbols into separate portions corresponding to a plurality of sub-carriers; and
approximating the pseudorandomly generated symbols with a plurality of sub-carrier symbols for the plurality of sub-carriers.

* * * * *